US008825472B2

(12) United States Patent
Raghuveer

(10) Patent No.: US 8,825,472 B2
(45) Date of Patent: Sep. 2, 2014

(54) AUTOMATED MESSAGE ATTACHMENT LABELING USING FEATURE SELECTION IN MESSAGE CONTENT

(75) Inventor: Aravindam Raghuveer, Bangalore (IN)

(73) Assignee: Yahoo! Inc., Sunnyvale, CA (US)

( * ) Notice: Subject to any disclaimer, the term of this patent is extended or adjusted under 35 U.S.C. 154(b) by 632 days.

(21) Appl. No.: 12/790,536

(22) Filed: May 28, 2010

(65) Prior Publication Data

US 2011/0295593 A1    Dec. 1, 2011

(51) Int. Cl.
*G06F 17/27*    (2006.01)
(52) U.S. Cl.
USPC ........... 704/9; 704/7; 704/8; 704/10; 704/257
(58) Field of Classification Search
USPC ...................................................... 704/2–10
See application file for complete search history.

(56) References Cited

U.S. PATENT DOCUMENTS

| 2004/0220925 | A1* | 11/2004 | Liu et al. ........................... 707/3 |
| 2007/0233459 | A1* | 10/2007 | Perronnin ......................... 704/9 |
| 2010/0179961 | A1* | 7/2010 | Berry et al. ................... 707/769 |

OTHER PUBLICATIONS

Picasa; photo sharing website; Jul. 2004; http://www.picasa.google.com.
Toutanova, K., et al., Stanford Log-linear Part-Of-Speech Tagger, computer program used to assign parts of speech to text; Aug. 16, 2004; http://nlp.stanford.edu/software/tagger.shtml.
BrowserPlus; browser technology that allows web developers to create rich web application with desktop capabilities; Oct. 28, 2008; http://browserplus.org.
Google Desktop; search application that allows for optimized search of users computer; Oct. 14, 2004; http://desktop.google.com.
Blum, A., Online algorithms in machine learning. in In Proceedings of the Workshop n On-Line Algorithms, Dagstuhl, pp. 306-325, Springer, 1996.
Boutell, M., at al., Bayesian fusion of camera metadata cues in semantic scene classification. Computer Vision and Pattern Recognistion, 2:623-630, 2004.
Carniero, G., et al., Formulating semantic image annotation as a supervised learning problem. In CVPR '05, pp. 163-168, Washington, DC, USA, 2005. IEEE Computer Society.
Carvalho, V.R., et al., Learning to extract signature and reply lines from email. In in Proceedings of the Conference on Email and Anti-Spam, 2004.
Chang, C.C., et al., LIBSVM; a library for support vector machines. http://www.csie.ntu.edu.tw/~cjlin/libsvm, 2001.
Datta, R., et al., Image retrieval:Ideas, influences, and trends of the new age. ACM Comput. Surv., 40(2):1-60, 2008.

(Continued)

*Primary Examiner* — Leonard Saint Cyr
(74) *Attorney, Agent, or Firm* — Greenberg Traurig, LLP; James J. DeCarlo

(57) ABSTRACT

Embodiments are directed towards an automated machine learning framework to extract keywords within a message that are relevant to an attachment to the message. The machine learning model finds a set of relevant sentences within the message determined to be relevant to the one or more attachments based on identification of one or more sentence level features within a given sentence. The sentence level features include, for example, anchor features, noisy sentence features, short message features, threading features, anaphora detections, and lexicon features. From the set of relevant sentences, useful keywords may be extracted using a sequence of heuristics to convert the sentence set into the set of useful keywords. The set of useful keywords may then be associated to at least one attachment such that the keywords may subsequently be used to perform various indexing, searching, sorting, and to provide further context to the attachment.

20 Claims, 7 Drawing Sheets

(56) References Cited

OTHER PUBLICATIONS

De Peer, A.T. et al., A machine learning libarary. vol. 10, pp. 931-934, 2009.

Dredze, M., et al., Intelligent email: reply and attachment prediction. In IUI '08, pp. 361-324, New York, NY, USA, 2008. ACM.

Dredze, M. et al., Generating summary keywords for emails uising topics. In IUI '08: Proceedings of the 13th international conference on Intelligent user interfaces, pp. 199-206, New York, NY, USA, 2008. ACM.

Hall, M., et al., The weka data mining software: An update. 2009.

Jaffe, A., et al., Generating summaries and visualization for large collections of geo-referenced photographs, in MIR '06, pp. 89-98, New York, NY, USA, 2006. ACM.

Ji, R., et al., Mining city landmarks from blogs by graph modeling, in MM '09: Proceedings of the seventeen ACM international conference on Multimedia, pp. 105-114, New York, NY, USA, 2009. ACM.

Jia, J., et al., Annotating personal albums via web mining. In ACM Multimedia, pp. 459-468, 2008.

Klimit, B., et al., The enron corpus: A new dataset for email classification research. In in Proceedings of the European Conference on Machine Learning (ECML, 2004).

Lafferty, J.D., et al., Conditional random fields: probabilistic models for segmenting and labeling sequence data. In Proceedings of ICML '01, pp. 282-289, San Francisco, CA, USA, 2001. Morgan Kaufmann Publishers, Inc.

Li, W., et al., Semi-supervised learning for image annotation based on conditional random fields, in CIVR, pp. 463-472, 2006.

Naaman, M., et al., How flickr helps us make sense of the world: context and content in community-contributed media collections, in In Proceedings of the 15th International Conference on Multimedia (MM2007), pp. 631-640, ACM, 2007.

Okazki, N., Crfsuite: a fast implementation of conditional random fields(crfs), 2007.

Rattenbury, T., et al., Towards automatic extraction of event and place semantics from flickr tags, in SIGIR '07, pp. 103-110, New York, NY, USA, 2007. ACM.

Sinha, P., et al., Classification and annotation of digital photos using optuical context data, in CIVR '08, pp. 309-318, New York, NY, USA, 2008, ACM.

Tang, J., et al., Inferring semantic concepts from community-contributed images and noisy tags, in MM '09: Proceedings of the seventeenth ACM international conference on Multimedia, pp. 223-232, New York, NY, USA, 2009, ACM.

Versley, Y., et al., Bart: A modular toolkit for coreference resolution, in Proceedings of the Sixth International Language Resources and Evaluation (LREC '08), Marrakech, Morocco, May 2008.

Von Ahn, L., et al., Labeling images with a computer game, in CHI '04: Proceedings of the SIGCHI conference on Human factors in computer systems, pp. 319-326, New York, NY, USA, 2004, ACM.

Yoo, S., et al., Mining social networks for personalized email prioritization, in KD '09, pp. 967-976, New York, NY, USA, 2009, ACM.

* cited by examiner

AUTOMATED MESSAGE ATTACHMENT LABELING USING FEATURE SELECTION IN MESSAGE CONTENT

TECHNICAL FIELD

The present invention relates generally to message attachment labeling and, more particularly, but not exclusively to employing an automated machine learning framework to extract keywords within a message that are determined to be relevant to attachments to the message, such keywords being usable for tagging the attachments for subsequent indexing and/or searching activities.

BACKGROUND

It is often said that "a picture speaks a thousand words." It may explain, at least in part, why so many people love to take and to share photographs. Even in the digital era, people love to share their photographs. The life of a digital photograph typically starts with an innocuous click of a camera. Thereafter, the digital photograph may be copied through several forms of digital media and sometimes even enriched using image editing software. At one or more stages in the life of the digital photograph, the photograph may be shared with a larger community, by means of emails, or other messaging mechanisms, or by means of an online photo-sharing service, or even by publishing the photographs on a webpage.

However, while a picture might "speak a thousand words," subsequently building indices, or other mechanisms usable to search for a photograph on, such as a computer system, remains a daunting task. The bane of semantic gap coupled with a rapid increase in the number of shared digital photographs has made this problem of search an extremely challenging one. To bridge this semantic gap, several approaches have been developed that attempt to exploit information obtained during different stages of life of the photograph to aid in tagging the photograph. For example, some digital cameras may embed selected information about the photograph within EXIF and/or GPS metadata. Such techniques, however, are often limited in the type and/or amount of information that may be embedded. Similarly, personal photo management and editing software allow for annotations to be associated with the photograph, however, such actions often require substantial efforts by a user to apply such annotations. This often means that many photographs remain un-annotated by such tools. Still other approaches propose the public to view photographs and directly or indirectly provide tags to the photographs. Again, this activity remains very labor intensive, and subject to much disagreement by the viewers. In addition, such community efforts may not provide a sufficient personal identification to photographs. Thus, it is with respect to these considerations and others that the present invention has been made.

BRIEF DESCRIPTION OF THE DRAWINGS

Non-limiting and non-exhaustive embodiments of the present invention are described with reference to the following drawings. In the drawings, like reference numerals refer to like parts throughout the various figures unless otherwise specified.

For a better understanding of the present invention, reference will be made to the following Detailed Description, which is to be read in association with the accompanying drawings, wherein.

DETAILED DESCRIPTION

Figure 1:
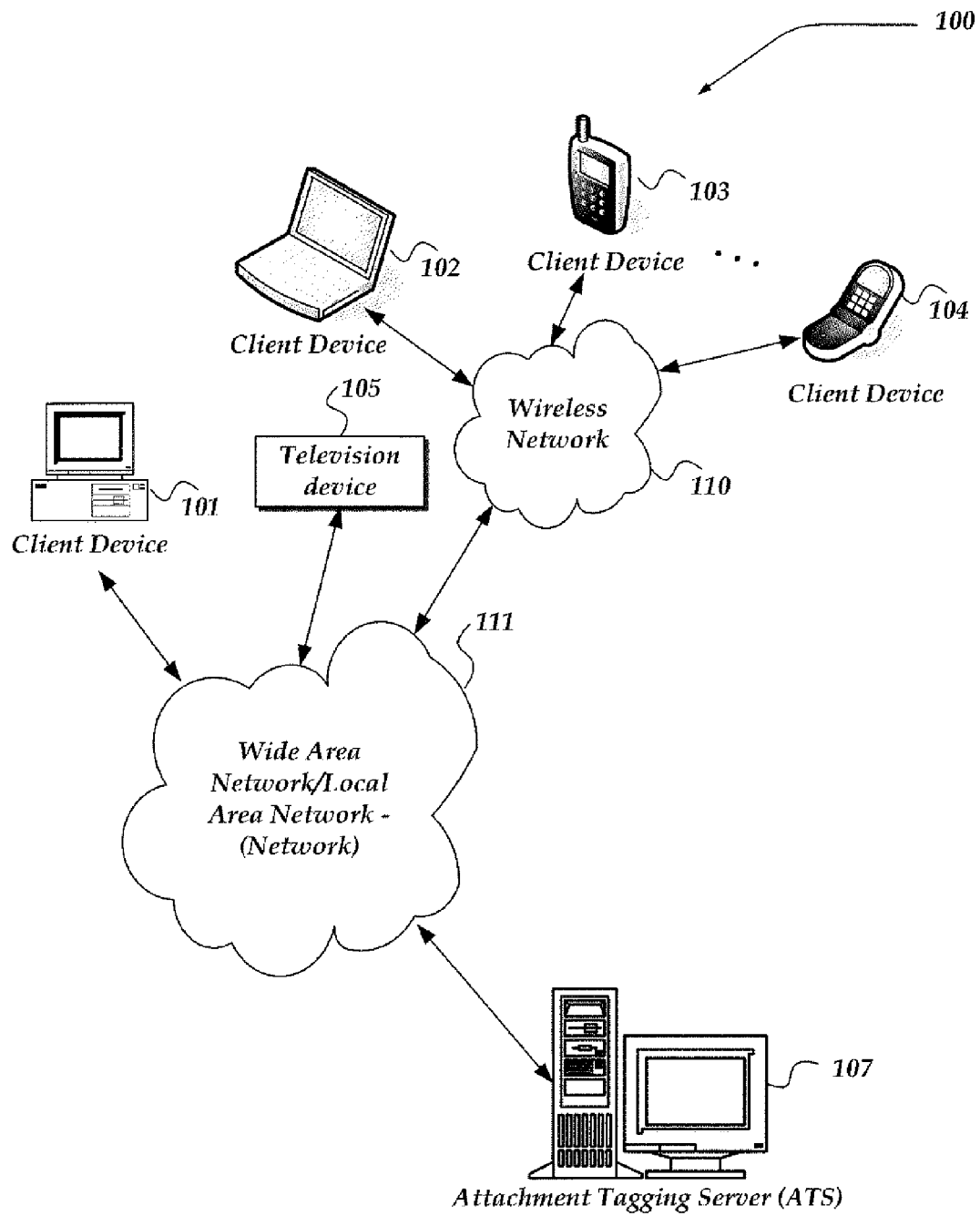
FIG. 1 is a system diagram of one embodiment of an environment in which the invention may be practiced.

The present invention now will be described more fully hereinafter with reference to the accompanying drawings, which form a part hereof, and which show, by way of illustration, specific embodiments by which the invention may be practiced. This invention may, however, be embodied in many different forms and should not be construed as limited to the embodiments set forth herein; rather, these embodiments are provided so that this disclosure will be thorough and complete, and will fully convey the scope of the invention to those skilled in the art. Among other things, the present invention may be embodied as methods or devices. Accordingly, the present invention may take the form of an entirely hardware embodiment, an entirely software embodiment or an embodiment combining software and hardware aspects. The following detailed description is, therefore, not to be taken in a limiting sense.

Throughout the specification and claims, the following terms take the meanings explicitly associated herein, unless the context clearly dictates otherwise. The phrase "in one embodiment" as used herein does not necessarily refer to the same embodiment, though it may. Furthermore, the phrase "in another embodiment" as used herein does not necessarily refer to a different embodiment, although it may. Thus, as described below, various embodiments of the invention may be readily combined, without departing from the scope or spirit of the invention.

In addition, as used herein, the term "or" is an inclusive "or" operator, and is equivalent to the term "and/or," unless the context clearly dictates otherwise. The term "based on" is not exclusive and allows for being based on additional factors not described, unless the context clearly dictates otherwise. In addition, throughout the specification, the meaning of "a," "an," and "the" include plural references. The meaning of "in" includes "in" and "on."

As used herein, the term "attachment" refers to any computer file that is sent along with an electronic message, independent of (without reference to) the file format, type, or content. Thus, an attachment may be sent in unencoded form, or encoded form using, for example, base64, binhex, uuencoding, MIME, or the like. The file format may also include various image formats, such as JPEG, MPEG, or the like. The file format may also include formats useable for sending word processing documents, spreadsheets, presentations, audio files, video files, or the like. Thus, as noted, attachments may include virtually any file format, type, or content. A computer file may be construed herein as an attachment even if the computer file is not a separate file to the message, but may be sent as part of the message to which it is attached. As used herein, unless the context clearly dictates otherwise, the term attachment may include a plurality of attachments, as well as a single attachment.

The following briefly describes the embodiments of the invention in order to provide a basic understanding of some aspects of the invention. This brief description is not intended as an extensive overview. It is not intended to identify key or critical elements, or to delineate or otherwise narrow the scope. Its purpose is merely to present some concepts in a simplified form as a prelude to the more detailed description that is presented later.

Briefly stated the present invention is directed towards employing an automated machine learning framework to extract keywords, also herein referred to as labels or tags, within a message that are determined to be relevant to an attachment to the message. Such keywords may then be employed to index and/or perform searches for the attachment, and to provide further context to the attachment.

A machine learning algorithm is initially trained as a machine learning model useable to recognize and identify sentences within a message that are determined to be relevant based on sentence level features, described in more detail below. In one embodiment, the machine learning algorithm is selected from any of a variety of supervised or minimally supervised machine learning algorithms, including, but not limited to a Naïve Bayes algorithm, Support Vector Machine (SVM) algorithm, Conditional Random Fields (CRF) algorithm, or the like. However, the invention is not constrained to any particular model or algorithm, and any of a variety of other classification algorithms may also be used, including, but not limited to, unsupervised learning algorithms, neural networks, decision trees, or the like. Thus, as used herein, the term "machine learning model" refers to any of the above identified trained machine learning algorithms, and derivatives or variations thereof. That is, as a machine learning algorithm is trained, it is referred to herein as a machine leaning model. In one embodiment, the output of the training includes various parameters, usable to configure/train the machine learning algorithm as a trained model on another computing device.

The trained machine learning model may then be employed to identify the relevant sentences with the message. That is, given a message E that has a set of one or more attachments, A, the trained machine learning model may be used to find a set of relevant sentences, $\hat{S}_{EA}$, from a set of sentences $S_E$ within the message which are determined to be relevant to the one or more attachments A. In one embodiment, the relevant sentences are selected based, in part, on identification of one or more binary, sentence level features within a given sentence within the message. The binary, sentence level features include, for example, anchor features, noisy sentence features, short message features, threading features, anaphora detections, and lexicon features. In one embodiment, each sentence may be represented as a feature vector, where various elements within the vector indicate a presence or absence (e.g., a binary representation) of one of the sentence level features. The machine learning model then predicts a label for each of the sentences, where the label refers to whether the sentence is relevant to the attachment or not. It should be noted that while a binary representation is described below, other representations, including multi-level representations, weighted levels, or the like, may also be used to represent the sentence level features.

From the set of relevant sentences, $\hat{S}_{EA}$, useful keywords may be extracted. In one embodiment, as described further below, a sequence of heuristics is employed to convert the sentence set $\hat{S}_{EA}$ into a set of useful keywords $K_{EA}$. The set of useful keywords may then be associated to at least one attachment such that the keywords may subsequently be used to perform various indexing, searching, sorting, and/or similar attachment management activities.

As described further below, the messages may be an outgoing message or in incoming message. That is, the message may be sent (outgoing) to another computing device, or be received at a given computing device (incoming). Moreover, the selection of the sentences, and subsequently the set of useful keywords may be performed at a server device, within a cloud architecture across one or more computing devices, and/or within a client device. Thus, the invention is not limited to a given architecture or environment.

Illustrative Operating Environment

FIG. 1 shows components of one embodiment of an environment in which the invention may be practiced. Not all the components may be required to practice the invention, and variations in the arrangement and type of the components may be made without departing from the spirit or scope of the invention. As shown, system 100 of FIG. 1 includes local area networks ("LANs")/wide area networks ("WANs")—(network) 111, wireless network 110, client devices 101-105, and Attachment Tagging Server (ATS) 107.

One embodiment of client devices 101-105 is described in more detail below in conjunction with FIG. 2. Generally, however, client devices 102-104 may include virtually any portable computing device capable of receiving and sending a message over a network, such as network 111, wireless network 110, or the like. Client devices 102-104 may also be described generally as client devices that are configured to be portable. Thus, client devices 102-104 may include virtually any portable computing device capable of connecting to another computing device and receiving information. Such devices include portable devices such as, cellular telephones, smart phones, display pagers, radio frequency (RF) devices, infrared (IR) devices, Personal Digital Assistants (PDAs), handheld computers, laptop computers, wearable computers, tablet computers, integrated devices combining one or more of the preceding devices, and the like. As such, client devices 102-104 typically range widely in terms of capabilities and features. For example, a cell phone may have a numeric keypad and a few lines of monochrome LCD display on which only text may be displayed. In another example, a web-enabled mobile device may have a touch sensitive screen, a stylus, and several lines of color LCD display in which both text and graphics may be displayed.

Client device 101 may include virtually any computing device capable of communicating over a network to send and receive information, including social networking information, performing various online activities, or the like. The set of such devices may include devices that typically connect using a wired or wireless communications medium such as personal computers, multiprocessor systems, microprocessor-based or programmable consumer electronics, network PCs, or the like. In one embodiment, at least some of client devices 102-104 may operate over wired and/or wireless network. Client device 105 may include virtually any device useable as a television device. Today, many of these devices include a capability to access and/or otherwise communicate over a network such as network 111 and/or even wireless network 110. Moreover, client device 105 may access various computing applications, including a browser, or other web-based application.

A web-enabled client device may include a browser application that is configured to receive and to send web pages, web-based messages, and the like. The browser application may be configured to receive and display graphics, text, multimedia, and the like, employing virtually any web-based language, including a wireless application protocol messages (WAP), and the like. In one embodiment, the browser application is enabled to employ Handheld Device Markup Language (HDML), Wireless Markup Language (WML), WMLScript, JavaScript, Standard Generalized Markup Language (SMGL), HyperText Markup Language (HTML), eXtensible Markup Language (XML), and the like, to display and send a message. In one embodiment, a user of the client device may employ the browser application to perform various activities over a network (online). However, another application may also be used to perform various online activities.

Client devices 101-105 also may include at least one other client application that is configured to receive content from another computing device. The client application may include a capability to provide and receive textual content, graphical content, audio content, and the like. The client application may further provide information that identifies itself, including a type, capability, name, and the like. In one embodiment, client devices 101-105 may uniquely identify themselves through any of a variety of mechanisms, including a phone number, Mobile Identification Number (MIN), an electronic serial number (ESN), or other mobile device identifier. The information may also indicate a content format that the mobile device is enabled to employ. Such information may be provided in a network packet, or the like, sent to ATS 107, or other computing devices.

Client devices 101-105 may further be configured to include a client application that enables an end-user to log into an end-user account that may be managed by another computing device, such as ATS 107, or the like. Such end-user account, for example, may be configured to enable the end-user to manage one or more online activities, including for example, search activities, social networking activities, browse various websites, make purchases, sell products/services, communicate with other users, or share attachments with others, or the like. However, participation in such online networking activities may also be performed without logging into the end-user account.

Moreover, client devices 101-105 may be configured to receive an application, script, plug-in, or other type of downloadable component over the network for use in identifying keywords within a message having one or more attachments, where the keywords are determined to be relevant to the attachment. The downloadable component may then provide the keywords for use in tagging the attachments for subsequent indexing and/or searching activities, among other actions. In another embodiment, however, client devices 101-105 may employ ATS 107 to identify the keywords within a message. Such messages may be identified as messages that are sent by a client device, herein referred to as outgoing messages, or messages that are received by a client device, herein referred to as incoming messages. It should be noted, where a user selects to store their messages at a network device, such as ATS 107, or the like, and not on their client device, outgoing messages herein includes messages that are directed towards another client device, or user's message server, while incoming messages include messages received by a user's message server or client device directed towards the user. In any event, identification of keywords relevant to an attachment may be performed selectively on outgoing messages, on incoming messages, or even a combination of incoming and outgoing messages.

Wireless network 110 is configured to couple client devices 102-104 and its components with network 111. Wireless network 110 may include any of a variety of wireless sub-networks that may further overlay stand-alone ad-hoc networks, and the like, to provide an infrastructure-oriented connection for client devices 102-104. Such sub-networks may include mesh networks, Wireless LAN (WLAN) networks, cellular networks, and the like.

Wireless network 110 may further include an autonomous system of terminals, gateways, routers, and the like connected by wireless radio links, and the like. These connectors may be configured to move freely and randomly and organize themselves arbitrarily, such that the topology of wireless network 110 may change rapidly.

Wireless network 110 may further employ a plurality of access technologies including 2nd (2G), 3rd (3G) generation radio access for cellular systems, WLAN, Wireless Router (WR) mesh, and the like. Access technologies such as 2G, 3G, and future access networks may enable wide area coverage for mobile devices, such as client devices 102-104 with various degrees of mobility. For example, wireless network 110 may enable a radio connection through a radio network access such as Global System for Mobil communication (GSM), General Packet Radio Services (GPRS), Enhanced Data GSM Environment (EDGE), Wideband Code Division Multiple Access (WCDMA), and the like. In essence, wireless network 110 may include virtually any wireless communication mechanism by which information may travel between client devices 102-104 and another computing device, network, and the like.

Network 111 is configured to couple network devices with other computing devices, including, ATS 107, client devices 101 and 105, and through wireless network 110 to client devices 102-104. Network 111 is enabled to employ any form of computer readable media for communicating information from one electronic device to another. Also, network 111 can include the Internet in addition to local area networks (LANs), wide area networks (WANs), direct connections, such as through a universal serial bus (USB) port, other forms of computer-readable media, or any combination thereof. On an interconnected set of LANs, including those based on differing architectures and protocols, a router acts as a link between LANs, enabling messages to be sent from one to another. In addition, communication links within LANs typically include twisted wire pair or coaxial cable, while communication links between networks may utilize analog telephone lines, full or fractional dedicated digital lines including T1, T2, T3, and T4, Integrated Services Digital Networks (ISDNs), Digital Subscriber Lines (DSLs), wireless links including satellite links, or other communications links known to those skilled in the art. Furthermore, remote computers and other related electronic devices could be remotely connected to either LANs or WANs via a modem and temporary telephone link. In essence, network 111 includes any communication method by which information may travel between computing devices.

Additionally, communication media typically embodies computer-readable instructions, data structures, program modules, or other transport mechanism and includes any information delivery media. By way of example, communication media includes wired media such as twisted pair, coaxial cable, fiber optics, wave guides, and other wired media and wireless media such as acoustic, RF, infrared, and other wireless media.

One embodiment of ATS 107 is described in more detail below in conjunction with FIG. 3. Briefly, however, ATS 107 may include any computing device capable of connecting to network 111 to extract keywords within a message that are relevant to an attachment to the message. In one embodiment, a machine learning algorithm is trained as a machine learning model to find a set of relevant sentences within the message determined to be relevant to the one or more attachments based on identification of one or more sentence level features within a given sentence. The sentence level features may include, for example, anchor features, noisy sentence features, short message features, threading features, anaphora detections, and lexicon features, each of which are described in more detail below. From the set of relevant sentences, useful keywords may be extracted or otherwise identified using a sequence of heuristics to convert the sentence set into a set of useful keywords. The set of useful keywords may then be associated to at least one attachment such that the keywords may subsequently be used to perform various indexing, searching, sorting, and to provide further context to the attachment. ATS 107 may employ processes such as those described below in conjunction with FIGS. 4-6 to perform at least some of its actions.

In one embodiment, ATS 107 may receive a request from one or more of client devices 101-105 and in response, provide a downloadable component, such as a script, application, plug-in, or the like, to the requesting client device. The downloadable component may operate standalone on the client device, or in conjunction with another component on the client device, such as a browser, Message client, or the like, for identifying keywords relevant to an attachment to a message. In one embodiment, the downloadable component may include a machine learning model.

ATS 107 may also be configured to train one or more machine learning models, obtain various parameters from the trained learning model and provide such parameters to a downloadable component on one or more client devices 101-015. In this manner, the downloadable component may also be able to identify keywords in a message that are relevant to a message attachment.

Devices that may operate as ATS 107 include various network devices, including, but not limited to personal computers, desktop computers, multiprocessor systems, microprocessor-based or programmable consumer electronics, network PCs, server devices, network appliances, and the like. It should be noted that while ATS 107 is illustrated as a single network device, the invention is not so limited. For example, ATS 107 may also represent a plurality of various network devices residing within a cloud architecture, or similar infrastructure. Thus, the invention is not to be construed as being limited to a single environment and other configurations, and architectures are also envisaged.

Illustrative Client Device

Figure 2:
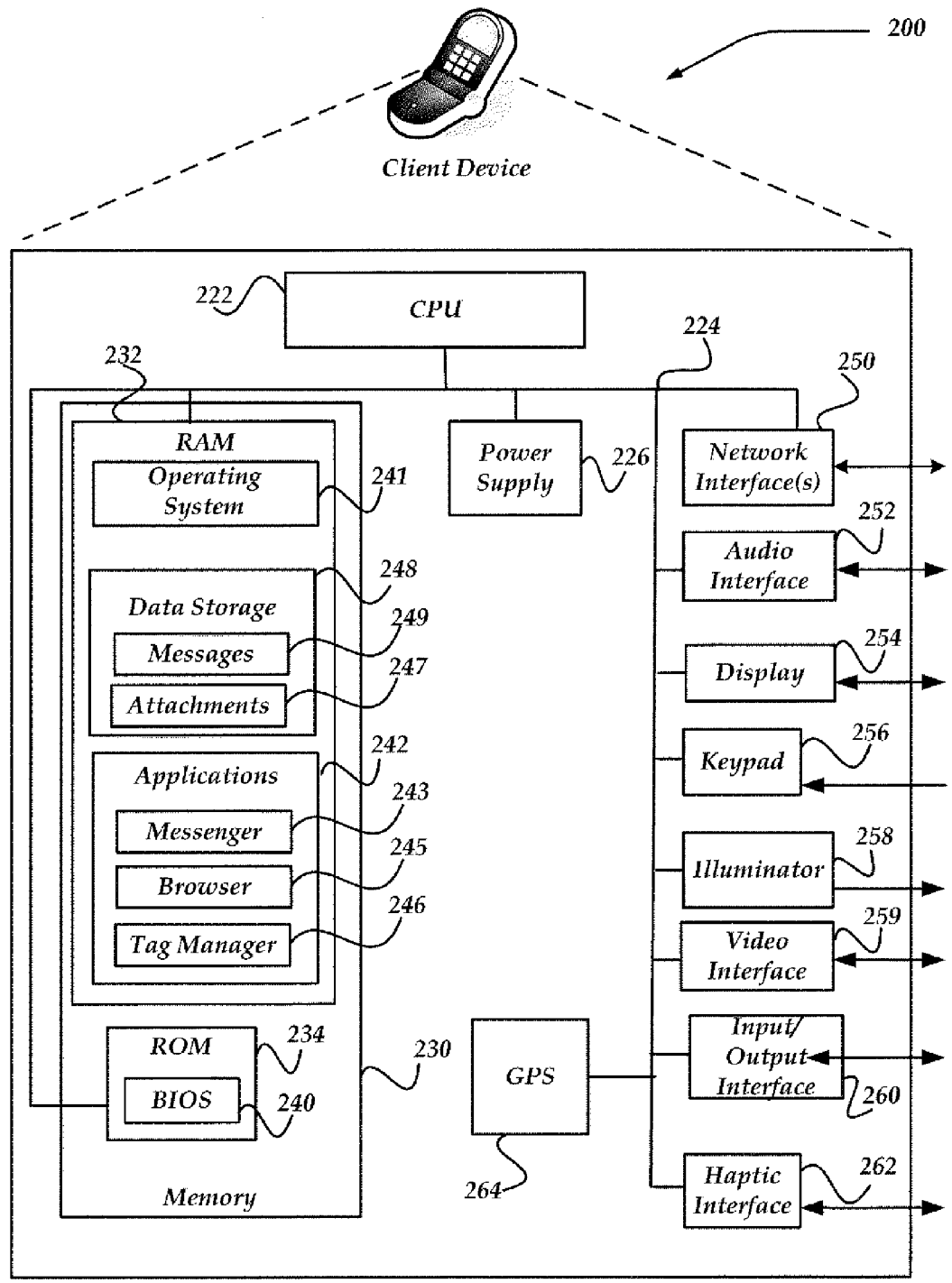
FIG. 2 shows one embodiment of a client device that may be included in a system implementing the invention.

FIG. 2 shows one embodiment of client device 200 that may be included in a system implementing the invention. Client device 200 may include many more or less components than those shown in FIG. 2. However, the components shown are sufficient to disclose an illustrative embodiment for practicing the present invention. Client device 200 may represent, for example, one embodiment of at least one of client devices 101-105 of FIG. 1.

As shown in the figure, client device 200 includes a processing unit (CPU) 222 in communication with a mass memory 230 via a bus 224. Client device 200 also includes a power supply 226, one or more network interfaces 250, an audio interface 252, a display 254, a keypad 256, an illuminator 258, an input/output interface 260, a haptic interface 262, and an optional global positioning systems (GPS) receiver 264. Power supply 226 provides power to client device 200. A rechargeable or non-rechargeable battery may be used to provide power. The power may also be provided by an external power source, such as an AC adapter or a powered docking cradle that supplements and/or recharges a battery.

Client device 200 may optionally communicate with a base station (not shown), or directly with another computing device. Network interface 250 includes circuitry for coupling client device 200 to one or more networks, and is constructed for use with one or more communication protocols and technologies including, but not limited to, global system for mobile communication (GSM), code division multiple access (CDMA), time division multiple access (TDMA), user datagram protocol (UDP), transmission control protocol/Internet protocol (TCP/IP), SMS, general packet radio service (GPRS), WAP, ultra wide band (UWB), IEEE 802.16 Worldwide Interoperability for Microwave Access (WiMax), SIP/RTP, or any of a variety of other wireless communication protocols. Network interface 250 is sometimes known as a transceiver, transceiving device, or network interface card (NIC).

Audio interface 252 is arranged to produce and receive audio signals such as the sound of a human voice. For example, audio interface 252 may be coupled to a speaker and microphone (not shown) to enable telecommunication with others and/or generate an audio acknowledgement for some action. Display 254 may be a liquid crystal display (LCD), gas plasma, light emitting diode (LED), or any other type of display used with a computing device. Display 254 may also include a touch sensitive screen arranged to receive input from an object such as a stylus or a digit from a human hand.

Keypad 256 may comprise any input device arranged to receive input from a user. For example, keypad 256 may include a push button numeric dial, or a keyboard. Keypad 256 may also include command buttons that are associated with selecting and sending images. Illuminator 258 may provide a status indication and/or provide light. Illuminator 258 may remain active for specific periods of time or in response to events. For example, when illuminator 258 is active, it may backlight the buttons on keypad 256 and stay on while the client device is powered. Also, illuminator 258 may backlight these buttons in various patterns when particular actions are performed, such as dialing another client device. Illuminator 258 may also cause light sources positioned within a transparent or translucent case of the client device to illuminate in response to actions.

Client device 200 also comprises input/output interface 260 for communicating with external devices, such as a headset, or other input or output devices not shown in FIG. 2. Input/output interface 260 can utilize one or more communication technologies, such as USB, infrared, Bluetooth™, or the like. Haptic interface 262 is arranged to provide tactile feedback to a user of the client device. For example, the haptic interface may be employed to vibrate client device 200 in a particular way when another user of a computing device is calling.

Optional GPS transceiver 264 can determine the physical coordinates of client device 200 on the surface of the Earth, which typically outputs a location as latitude and longitude values. GPS transceiver 264 can also employ other geo-positioning mechanisms, including, but not limited to, triangulation, assisted GPS (AGPS), E-OTD, CI, SAI, ETA, BSS or the like, to further determine the physical location of client device 200 on the surface of the Earth. It is understood that under different conditions, GPS transceiver 264 can determine a physical location within millimeters for client device 200;

and in other cases, the determined physical location may be less precise, such as within a meter or significantly greater distances. In one embodiment, however, mobile device may through other components, provide other information that may be employed to determine a physical location of the device, including for example, a MAC address, IP address, or the like.

Mass memory 230 includes a RAM 232, a ROM 234, and other storage means. Mass memory 230 illustrates an example of computer readable storage media (devices) for storage of information such as computer readable instructions, data structures, program modules or other data. Mass memory 230 stores a basic input/output system ("BIOS") 240 for controlling low-level operation of client device 200. The mass memory also stores an operating system 241 for controlling the operation of client device 200. It will be appreciated that this component may include a general-purpose operating system such as a version of UNIX, or LINUX™, or a specialized client communication operating system such as Windows Mobile™, or the Symbian® operating system. The operating system may include, or interface with a Java virtual machine module that enables control of hardware components and/or operating system operations via Java application programs.

Memory 230 further includes one or more data storage 248, which can be utilized by client device 200 to store, among other things, applications 242 and/or other data. For example, data storage 248 may also be employed to store information that describes various capabilities of client device 200. The information may then be provided to another device based on any of a variety of events, including being sent as part of a header during a communication, sent upon request, or the like. Data storage 248 may also be employed to store social networking information including address books, buddy lists, aliases, user profile information, or the like. Further, as illustrated, data storage 248 may also store messages 249, and attachments 247 to the messages. Data storage 248 may also store sentences determined to be relevant to attachments 247 and/or keywords about the attachments 247. In one embodiment, data storage 248 may also include parameters and/or other data useable by Tag Manager 246. At least a portion of the information may also be stored on a disk drive or other computer-readable storage device (not shown) within client device 200.

Applications 242 may include computer executable instructions which, when executed by client device 200, transmit, receive, and/or otherwise process messages (e.g., SMS, MMS, IM, email, and/or other messages), audio, video, and enable telecommunication with another user of another client device. Other examples of application programs include calendars, search programs, email clients, IM applications, SMS applications, VOIP applications, contact managers, task managers, transcoders, database programs, word processing programs, security applications, spreadsheet programs, games, search programs, and so forth. Applications 242 may include, for example, messenger 243, browser 245, and Tag Manager 246.

Browser 245 may include virtually any application configured to receive and display graphics, text, multimedia, and the like, employing virtually any web based language. In one embodiment, the browser application is enabled to employ Handheld Device Markup Language (HDML), Wireless Markup Language (WML), WMLScript, JavaScript, Standard Generalized Markup Language (SMGL), HyperText Markup Language (HTML), eXtensible Markup Language (XML), and the like, to display and send a message. However, any of a variety of other web-based languages may be employed.

In one embodiment, browser 245 may be configured to enable access to a graphical user interface provided by ATS 107 of FIG. 1 and/or Tag Manager 246. In one embodiment, the user interface may be employed by a user of client device 200 to review and/or manage keywords identified for a message attachment.

Messenger 243 may be configured to manage a messaging session using any of a variety of messaging communications including, but not limited to email, Short Message Service (SMS), Instant Message (IM), Multimedia Message Service (MMS), internet relay chat (IRC), mIRC, RSS feeds, and/or the like. For example, in one embodiment, messenger 243 may be configured as an IM application, such as AOL Instant Messenger, Yahoo! Messenger, .NET Messenger Server, ICQ, or the like. In one embodiment messenger 243 may be configured to include a mail user agent (MUA) such as Elm, Pine, MH, Outlook, Eudora, Mac Mail, Mozilla Thunderbird, or the like. In another embodiment, messenger 243 may be a client application that is configured to integrate and employ a variety of messaging protocols, including, but not limited to various push and/or pull mechanisms for client device 200. In one embodiment, messenger 243 may interact with browser 245 for managing messages. As used herein, the term "message" refers to any of a variety of messaging formats, or communications forms, including but not limited to email, SMS, IM, MMS, IRC, or the like. Further, messenger 243 may also interact with Tag Manager 246 to enable tagging of attachments and to provide a user interface useable for managing identified keywords.

Tag Manager 246 may operate as a downloadable component useable to identify keywords that are considered relevant to an attachment to a message. Tag Manager 246 may operate as a plug-in to another component such as messenger 243, browser 245, or the like. In one embodiment, Tag Manager 246 may operate as a standalone component, receiving messages, attachments, or the like, through a variety of mechanisms, including a data storage location, from another application, or the like.

In one embodiment, Tag Manager 246 may be configured to include a machine learning model, or the like. The machine learning model may include various parameters, and/or receive various parameters over a network, or other mechanism, where such parameters are useable to train the machine learning model to identify the relevant keywords to a message attachment from within the message. Tag Manager 246 may employ processes such as described below in conjunction with FIGS. 5-6 to perform at least some of its actions. Moreover, Tag Manager 246 may provide a user interface, such as described below in conjunction with FIG. 7 for use in enabling a user to manage the identified relevant keywords.

Illustrative Network Device

Figure 3:
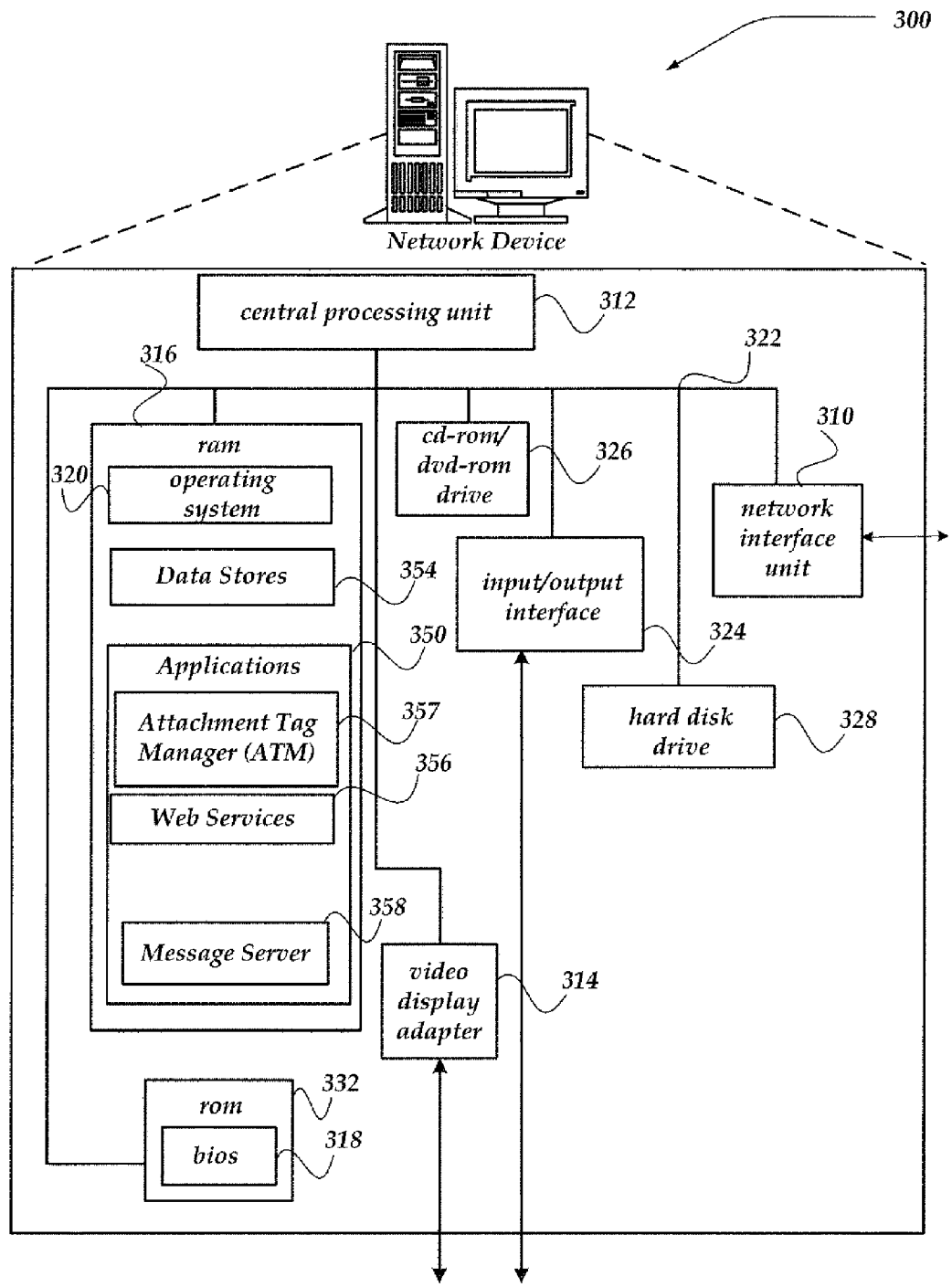
FIG. 3 shows one embodiment of a network device that may be included in a system implementing the invention.

FIG. 3 shows one embodiment of a network device 300, according to one embodiment of the invention. Network device 300 may include many more or less components than those shown. The components shown, however, are sufficient to disclose an illustrative embodiment for practicing the invention. Network device 300 may represent, for example, ATS 107 of FIG. 1.

Network device 300 includes processing unit 312, video display adapter 314, and a mass memory, all in communication with each other via bus 322. The mass memory generally includes RAM 316, ROM 332, and one or more permanent mass storage devices, such as hard disk drive 328, tape drive, optical drive, and/or floppy disk drive. The mass memory stores operating system 320 for controlling the operation of network device 300. Any general-purpose operating system may be employed. Basic input/output system ("BIOS") 318 is also provided for controlling the low-level operation of network device 300. As illustrated in FIG. 3, network device 300 also can communicate with the Internet, or some other communications network, via network interface unit 310, which is constructed for use with various communication protocols including the TCP/IP protocol. Network interface unit 310 is sometimes known as a transceiver, transceiving device, or network interface card (NIC).

The mass memory as described above illustrates another type of computer-readable media, namely computer-readable storage media. Computer-readable storage media may include volatile, nonvolatile, removable, and non-removable media implemented in any method or technology for storage of information, such as computer readable instructions, data structures, program modules, or other data. Examples of computer readable storage media include RAM, ROM, EEPROM, flash memory or other memory technology, CD-ROM, digital versatile disks (DVD) or other optical storage, magnetic cassettes, magnetic tape, magnetic disk storage or other magnetic storage devices, or any other physical medium which can be used to store the desired information and which can be accessed by a computing device.

As shown, data stores 354 may include a database, text, spreadsheet, folder, file, or the like, that may be configured to maintain and store user account identifiers, user profiles, email addresses, IM addresses, and/or other network addresses; or the like. Data stores 354 may also store various messages, message attachments, and/or keywords determined to be relevant to a message attachment. In one embodiment, storage of such information may be based on a specific user, user account, profile, or the like. Thus, in one embodiment, storage of the information may be configured to provide at least some security and/or privacy constraints on the information. Data stores 354 may further include program code, data, algorithms, and the like, for use by a processor, such as central processing unit (CPU) 312 to execute and perform actions. In one embodiment, at least some of data store 354 might also be stored on another component of network device 300, including, but not limited to cd-rom/dvd-rom 326, hard disk drive 328, or the like.

The mass memory also stores program code and data. One or more applications 350 are loaded into mass memory and run on operating system 320. Examples of application programs may include transcoders, schedulers, calendars, database programs, word processing programs, HTTP programs, customizable user interface programs, IPSec applications, encryption programs, security programs, SMS message servers, IM message servers, email servers, account managers, and so forth. Web server 357, messaging server 356, and Attachment Tag Manager (ATM) 357, may also be included as application programs within applications 350.

Web server 357 represent any of a variety of services that are configured to provide content, including messages, over a network to another computing device. Thus, web server 357 includes for example, a web server, a File Transfer Protocol (FTP) server, a database server, a content server, or the like. Web server 357 may provide the content including messages over the network using any of a variety of formats, including, but not limited to WAP, HDML, WML, SMGL, HTML, XML, cHTML, xHTML, or the like.

Messaging server 356 may include virtually any computing component or components configured and arranged to forward messages from message user agents, and/or other message servers, or to deliver messages to a local message store, such as data store 354, or the like. Thus, messaging server 356 may include a message transfer manager to communicate a message employing any of a variety of email protocols, including, but not limited, to Simple Mail Transfer Protocol (SMTP), Post Office Protocol (POP), Internet Message Access Protocol (IMAP), NNTP, or the like. Messaging server 356 may also be managed by one or more components of messaging server 356. Thus, messaging server 356 may also be configured to manage SMS messages, IM, MMS, IRC, RSS feeds, mIRC, or any of a variety of other message types. In one embodiment, messaging server 356 may enable users to initiate and/or otherwise conduct chat sessions, VOIP sessions, or the like.

ATM 357 is configured to extract keywords within a message that are relevant to an attachment to the message. In one embodiment, ATM 357 includes machine learning model that may be trained to find a set of relevant sentences within the message determined to be relevant to the one or more attachments based on identification of one or more sentence level features within a given sentence. From the set of relevant sentences, useful keywords may be extracted to convert the sentence set into the set of useful keywords. The set of useful keywords may then be associated to at least one attachment such that the keywords may subsequently be used to perform various indexing, searching, sorting, and to provide further context to the attachment. ATM 357 may employ processes such as those described below in conjunction with FIGS. 4-6 to perform at least some of its actions. In one embodiment, ATM 357 may also provide a user interface such as described below in conjunction with FIG. 7 to enable a user to manage privacy issues, or the like, associated with the keywords.

In one embodiment, ATM 357 may also be configured to perform re-training of the machine learning model based on various criteria. In one embodiment, ATM 357 may perform such re-training based on an elapsed time period, feedback from one or more users regarding the determined keywords, or any of a variety of other criteria. Updated parameters for the re-trained machine learning model may then be distributed to one or more client devices for use in a downloadable component also useable to identify such keywords.

Generalized Operation

The operation of certain aspects of the invention will now be described with respect to FIGS. 4-6. As noted, the invention is directed to addressing the problem of, given a message E that has a set of attachments A, finding a set of keywords $K_{EA}$ that appear in E, and are relevant to the attachments A. Briefly, herein this problem is divided into two sub-problems. The first sub-problem identifies a subset of sentences $\hat{S}_{EA}$ from the set of sentences $S_E$ belonging to the message E, which are relevant to the attachments A. In one embodiment, a minimally supervised machine learning algorithm or model is employed to solve this problem. However, other models or algorithms may also be used. The second sub-problem extracts useful keywords from the set of $\hat{S}_{EA}$ generated by the solution to the first sub-problem. In one embodiment, a sequence of heuristics is employed to convert the sentence set $\hat{S}_{EA}$ into the keyword set $K_{EA}$. The processes described below in conjunction with FIGS. 5 and 6 describe one embodiment of a solution for the first and second sub-problems, respectively. In addition, the process described below in conjunction with FIG. 4 describes training of a machine learning algorithm to generate a machine learning model.

Figure 4:
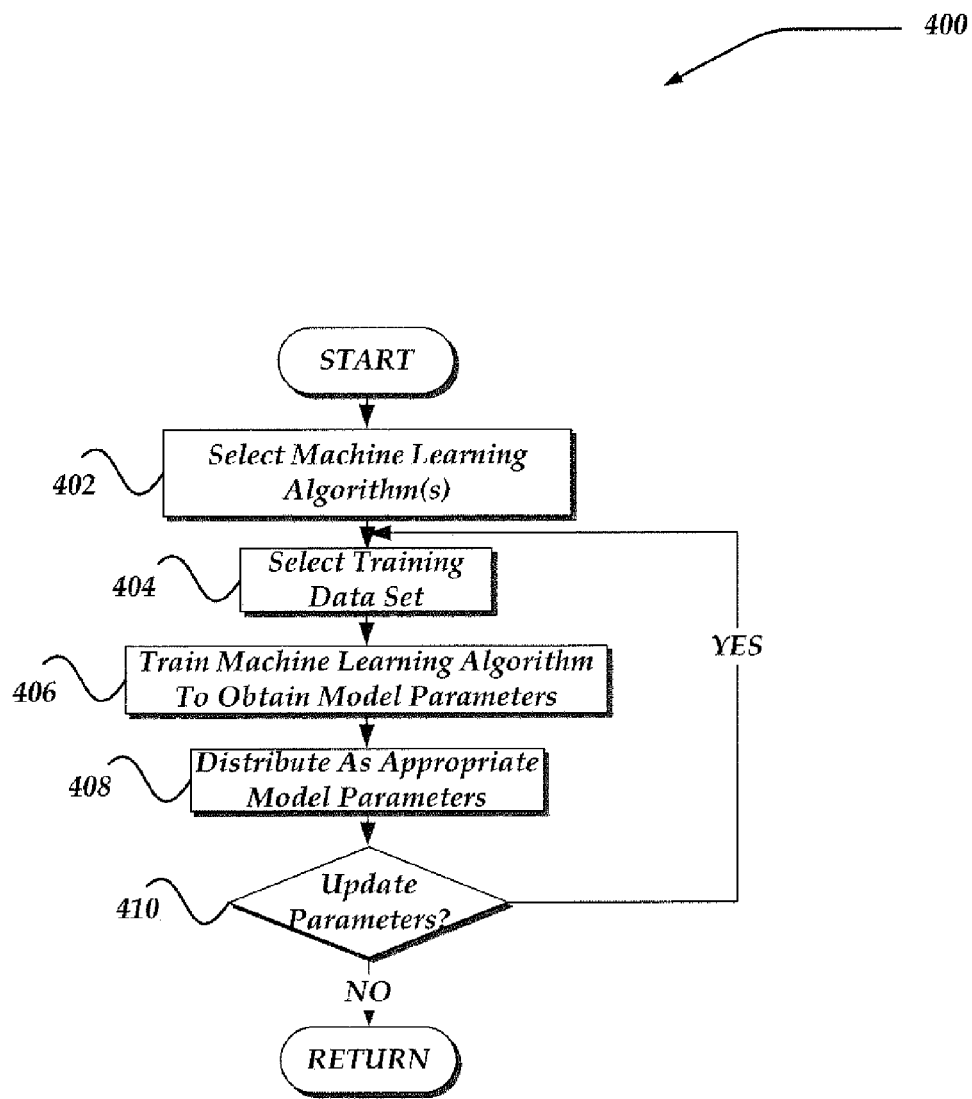
FIG. 4 illustrates a logical flow diagram generally showing one embodiment of an overview process for training a machine learning algorithm to generate a model for use in identifying relevant sentences within a message for labeling a message attachment.

Thus, FIG. 4 illustrates a logical flow diagram generally showing one embodiment of an overview process for training a machine learning algorithm for use in identifying relevant sentences within a message for labeling a message attachment. Process 400 of FIG. 4 may be implemented within network device 300 of FIG. 3, in one embodiment.

Process 400 begins, after a start block, at block 402 where a machine learning algorithm is selected. Virtually any classification algorithm may be used. For example, the classification algorithm may be selected from any of a variety of supervised or minimally supervised machine learning algorithms, including, but not limited to a Naïve Bayes algorithm, Support Vector Machine (SVM) algorithm, Conditional Random Fields (CRF) algorithm, or the like. However, any of a variety of other classification algorithm may also be used, including, but not limited to, unsupervised learning algorithms, neural networks, decision trees, or the like.

In one embodiment, because the problem may be decomposed into a binary classification problem, non-sequential machine learning algorithms, such as the Naïve Bayes, or SVM may be selected. Similarly, a sequential algorithm such as the CRF may also be selected. The Naïve Bayes algorithm appears to be lightweight, and as such may be useable where the model is embedded within a downloadable component on a client device. The SVM appears to be very effective with text corpus. However, as noted, other models/algorithms may also be chosen.

Processing then flows to block 404, where a plurality of messages having attachments is selected. In one embodiment, the selected messages are outgoing messages from one or more users. However, the invention is not constrained to merely outgoing messages. Selection of outgoing messages, however, may reduce a number of redundant messages that may arise due to a user receiving similar message/attachments from multiple sources. In one embodiment, the number of messages used as the training set may be fairly small, between 200-600 messages. However, other set sizes may also be selected. In one embodiment, the number of messages in the training set may be based in part on the selected machine learning algorithm. For example, a Naïve Bayes may reach it best performance with less messages that the SVM or even the CRF model.

In any event, processing next continues to block 406, where the selected machine learning algorithm is trained using the selected training data set to generate a trained machine learning model. In one embodiment, various machine learning models may reach a predefined quality of performance based on differing amounts of the training data.

Moreover, while training of the machine learning model may produce a set of parameters that define the trained model, in some instances, it may be desirable to further tune the selected model. One example of an SVM implementation is the libSVM library, which is available through the Department of Computer Science National Taiwan University. In libSVM, the Radial Basis Function kernel may provide improved performance over the linear kernel. In one embodiment, the model may be further tuned by setting a margin parameter C to a value, such as 10. However, other values may also be selected, including values between $10^{-2}$ and $10^2$.

In one embodiment, where the CRF selected might include a CRFSuite implementation, tuning of parameters might include L2 regularizations being preferred in some situations over L1 regularizations. In any event, such tuning of parameters and determined parameters from the training of the model selected at block 406 may then be distributed at block 408 to one or more models to update/train/re-train the model configuration.

Processing then flows to decision block 410 to determine whether to update the model parameters again. As noted, such updates may be based on a variety of criteria. In any event, if the parameters are to be updated, processing may loop back to block 404, where another training data set may be selected. Otherwise, processing returns to a calling process to perform other actions.

Figure 5:
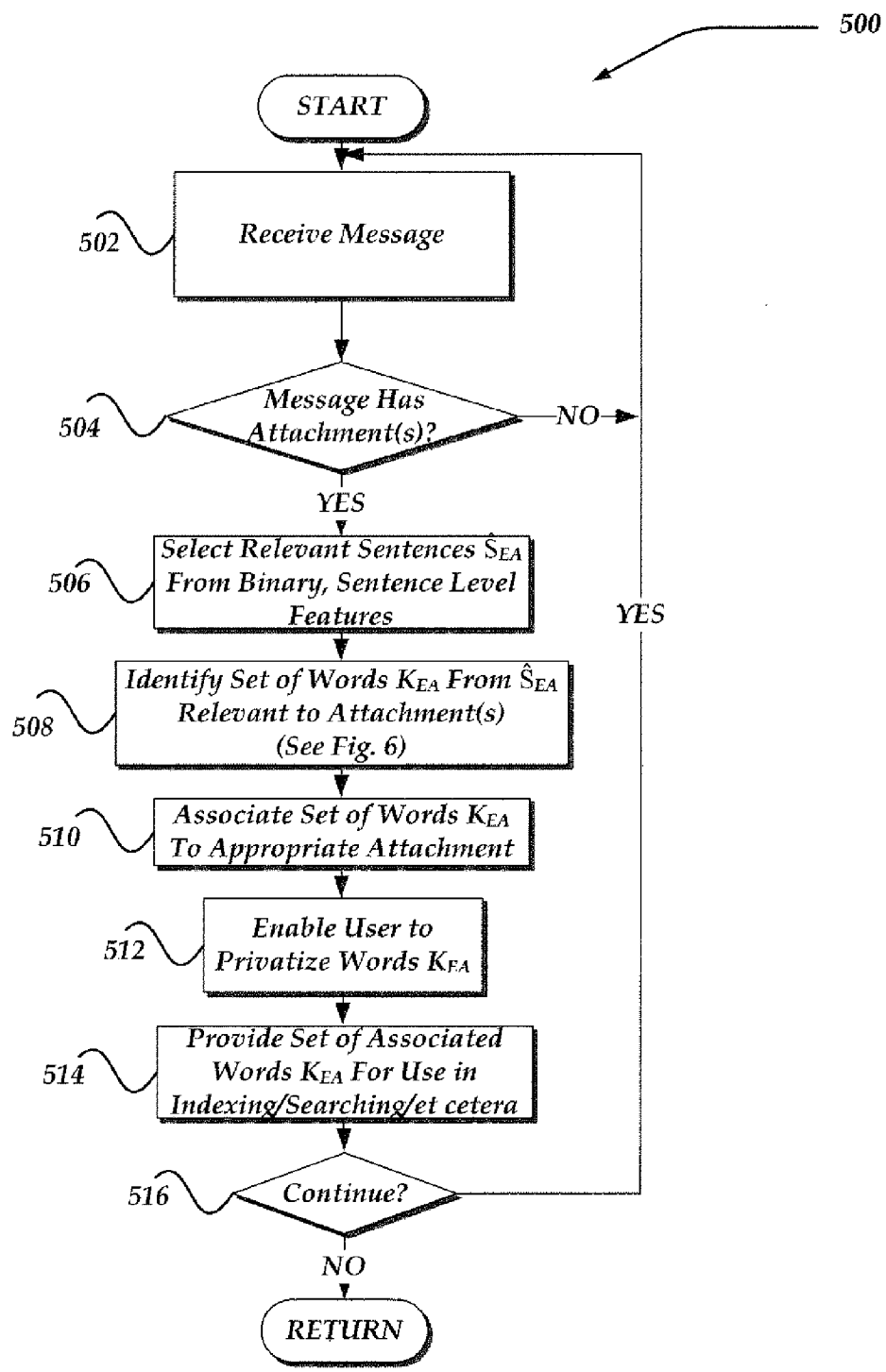
FIG. 5 illustrates a logical flow diagram generally showing one embodiment of an overview process for identifying relevant sentences with the message using the machine learning model and binary, sentence level features.

FIG. 5 illustrates a logical flow diagram generally showing one embodiment of an overview process for identifying relevant sentences with the message using the machine learning model and binary, sentence level features. Process 500 of FIG. 5 may be implemented within one or more of client devices 101-105 and/or ATS 107 of FIG. 1.

Process 500 begins, after a start block, at block 502, where a message is received. As noted elsewhere, the message may be an outgoing message that is received for examination and/or identification of keywords relevant to an attachment. However, the received message may also be an incoming message. In any event, processing then flows to decision block 504, where a determination is made whether the message includes one or more attachments. If the message does not include one or more attachments, the process loops back to block 502; otherwise, processing continues to block 506.

At block 506, the relevant sentences $\hat{S}_{EA}$ are selected using the machine learning model and based on the binary, sentence level features. Unlike previous approaches, the approach described herein does not use user specific features, in part because user specific features may be difficult to obtain, difficult to interpret, and/or inconsistent, especially as related to training data sets. It should be recognized that while not all of the features need to be employed, the combination of features, used within the context of an automated machine learning framework, is believed to be unique.

In one embodiment, a sentence feature vector is generated that represents a presence or absence of a corresponding feature for the given sentence. The sentence feature vectors for each of the sentences in the message are then fed into the machine learning model to identify the relevant sentences to the attachment. The following describes each of the sentence level features useable to generate the sentence feature vector.

Anchor Features

A first set of sentence level features is herein referred to as anchor features. An anchor sentence may be defined as a sentence in the message that is determined to have a very high probability of directly referring to the attachment. At least four Boolean, sentence level anchor features may be used to detect anchor sentences.

Strong Phrase Anchor

A strong phrase anchor may be marked as true within a corresponding sentence's feature vector if it has one of the following phrases in it: attach, here is, or enclosed. These terms may be called strong anchor phrases. When one of the strong anchor phrases appears within a sentence, there is a high chance that the sentence in which it appears is relevant to the attachment. However, the anchor sentence may not be the only sentence that is relevant to the attachment. Moreover, while the presence of a strong anchor phrase feature is a powerful signal to predict sentences relevant to the attachment, other features may also be employed to cover those messages that may not include such features, but are still relevant.

Extension Anchor

In many messages, a message sender may refer to the attachment by its file type. For example, if the attachment is an .xls file type, the users may refer to the attachment as a "spreadsheet," "report," "excel file," or the like. If the attachment is a .jpg file, the users may refer to the attachment as a "picture," "image," "snap," "photo," or the like. A non-limiting example of such usage may be seen in the following message snippet:

Please refer to the attached spreadsheet for a list of Associates and Analysts who will be ranked in these meetings and their PRC Reps.

In one embodiment, a dictionary, or similar mechanism, may be used to map file extensions to the keywords the file extension could be referred to as. Given an attachment extension, the keywords may be fetched from the dictionary and the extension anchor in a given sentence feature vector may then be set to true for those sentences that have one or more of the keywords. As noted elsewhere, such file extension features are designed for any kind of file extension and are not necessarily limited to image files.

With keyword based matches, however, it may be possible to have false matches with the same word when used in a different context. Therefore, to overcome this issue, part of speech (POS) tagging may be employed to minimize this category of noise. In one embodiment, the Stanford Part of Speech Tagger, which may be obtained from Stanford University, may be used to tag all the words with their part of speech elements. A constraint may then be used that the keyword found in the sentence is a noun for the extension anchor feature to trigger. It should be noted that other POS taggers may also be used, and the invention is not to be construed as being limited to a single tagger.

Attachment Name Anchor

Another useful behavior pattern that may be used as a sentence level feature is based on that users tend to use tokens, or portions of names, from the file name of the attachment to refer to the attachment. Attachment names can be tokenized on case transition boundaries, such as lowercase to uppercase transitions, vice versa, punctuation symbols boundaries, or the like. For example, consider the following non-limiting message snippet:

These are book requests for the Netco books for all regions. Please let me know if you have any questions.

The message may include 5 attachments each of the form "Book Request Form region_name.xls," with region_name replaced with one of "Financial," "East," "Central," "Texas," or "West." With the attachment name anchor, for the example above, the first sentence would be recognized as relevant to the attachment.

Another useful property used herein of an attachment name anchor is that when the attachment name anchor is true for a given sentence, $s_i$, then $s_i$ is determined to be most likely relevant to that attachment whose file name tokens were found in $s_i$. This property is herein exploited to assign attachment specific tags/keywords when a message includes more than one attachment as described further below.

Weak Phrase Anchor

A weak phrase anchor feature is similar to a strong phrase anchor, at least in principle. However, the weak phrase anchor differs in that it provides weaker signals compared to the strong phrase anchor. Weak anchor phrases considered herein include: above, below, following, forward, file, draft, and report. While it may appear that use of such weak anchor phrases could lead to loss in precision, when used in conjunction with other sentence level features, it may actually increase precision. To minimize noise, a restriction may be included that when the words file, draft, or report appear within a sentence, such words are to be used as nouns, Noisy Sentence Features Another of the sentence level features is herein referred to as noisy sentence, or simply noise, features. Two features may be used to mark sentences that are most likely not interesting. These features are put in place to capture artifacts like signature sections of messages, header sections of messages and/or message threads, and the like. The first noise feature is the noisy noun feature. This feature is marked true within a sentence feature vector if more than about 85% of the words in the sentence are determined to be nouns. Other percentages may also be used, thus, the invention is not limited to 85%. For example, percentages between 82-92% could also be used.

Another noise feature is the noisy verb feature, where the feature is marked true within a sentence feature vector if there are determined to be no verbs in the sentence. However, other values may also be used, including some percentage of words less than a determined percentage, such as 1% or the like.

Short Messages

Another of the sentence level features is herein referred to short message, or length feature. The short or length message feature is marked true within a sentence feature vector if the message to which the sentence belongs has less than or equal to some defined number of sentences, typically between 3-5. This is based on the concept that all sentences in a short message tends to be relevant to the attachment.

Conversation Level in a Message Thread

Another of the sentence level features is herein referred to a thread level feature. Many messages may consist of multiple conversations. Each conversation is a message sent by a user either in response to a previous conversation or is the first message in the thread. The level of a conversation refers to how close a given conversation is to a last conversation. The last conversation may have a level equal to zero. So, the higher the level of the conversation, the older the conversation may be considered to be in the message thread.

Consider a case where the strong phrase anchor feature is triggered for a sentence with a level of five (i.e., it is part of the fifth conversation of a message thread). It may be determined that it is very unlikely that this sentence refers to the attachment in the current conversation in the zero$^{th}$ level. Thus, it may be determined that levels beyond, for example, the second conversation are likely not to have content relevant to the attachment used in the first level conversation. Thus, two sub-features may be defined to represent this thread level feature. A first such sub-feature may be referred to conversation levels $\geq 2$. This sub-feature is marked true if the sentence appears in a first or second level conversation of the thread. A second sub-feature may be referred to as conversation levels >2, which is marked true if the sentence appears in a conversation of more than level two.

In one embodiment, simple heuristics may be employed to determine a level of a given sentence. For example, the > symbol is often employed in messages as a strong indicator of a reply thread. This can be extended to count a number of leading > symbols to indicate the level of a thread. Thus, if a sentence starts with >>, for example, it may be determined that the level of the sentence is two. In one embodiment, any number of whitespace characters can be present between the two > symbols.

Anaphora Detection Feature

Another of the sentence level features is herein referred to an anaphora detection feature. The anchor features described above help identify sentences in a message that directly refer to an attachment. However, the anaphora detection feature is employed to capture indirect references to attachments. By capturing indirect references, this feature aids the learning model to track hidden contexts within the message: Consider the following:

I made my staff burn the midnight oil last night putting together TW/NNG revenue summaries for review by the bankers that Rod/Kevin are working with. Thought you might be interested in the reports. It gives a nice snapshot of our activity with our major counterparts.

In the above non-limiting example, the first sentence has an attachment name anchor and the second sentence has an extension anchor. Hence both sentences can be identified as relevant to the attachment. The third line uses a pronoun reference to continue the description about the attachment. However, using the features above, it is unlikely that the dependency between the second and third sentences would be tracked. Therefore, it is unlikely that the third sentence would be identified as being related to the attachment.

However, in the context of linguistics, the pronouns (it, in the above example) are referred to as an anaphora, and the noun (the report, in the example) that it refers to is called the antecedent. It is noted that the anaphora can also be another noun, such as abbreviations, or the like. The problem of detecting this third sentence (or similar sentence features) is resolved herein by exploiting this anaphora relationship. That is, the anaphora feature in a sentence feature vector may be marked as true for a sentence that has a back reference to an anchor sentence, thus helping to track indirect references to the attachment.

The anaphora feature may be determined as follows. A Part of Speech (POS) Tagger may be used to identify all the nouns in an anchor sentence. In one embodiment, the Stanford POS Tagger may be employed; however, other POS taggers may also be used. Then, the pronouns and nouns in other sentences that refer to the nouns used in the anchor sentence are identified. In one embodiment, a BART framework may be used; however, other Natural Language Processing tools, taggers, or the like, may also be used. This operation establishes a link between an anchor sentence and other sentences that depend on the anchor sentence. Thus, the anaphora feature is marked true for dependent sentences.

Lexicon Feature

Another of the sentence level features is herein referred to a lexicon feature. In this feature, a dictionary of words may be constructed using various sources. For example, in one embodiment, the training message data set may be used to create the dictionary. The stop words may be selectively removed from the dictionary. Further, a stemming algorithm may be employed to identify different forms of a word. For example, the words enclosing, enclosed, and enclose may be viewed as different forms of the same base word—enclose. Thus, using the stemming algorithm, the related words may be identified and normalized to the base word (removing redundancies). Each word that appears in the dictionary may then be defined as a lexicon feature. One example of a useable stemming algorithm is Porter's stemming algorithm; however, others may also be used.

For a given sentence then, the lexicon feature may be set to true if the corresponding word appears in the sentence. Using the lexicon feature is directed towards boosting the precision of weak signal features like the weak phrase anchor.

As stated above, the sentence feature vectors for each of the sentences in the message are then fed into the machine learning model to identify the relevant sentences $\hat{S}_{EA}$ to the attachment, as shown at block 506 of FIG. 5.

Continuing with FIG. 5, process 500 then flows to block 508, which is described in more detail below in conjunction with FIG. 6. Briefly, however, at block 508, a set of one or more words $K_{EA}$ (keywords) from $\hat{S}_{EA}$ are identified as being further relevant to the attachments. In one embodiment, a sequence of heuristics is applied to the $\hat{S}_{EA}$.

Flowing next to block 510, the set of one or more keywords are associated to the appropriate attachment. As noted above, the identification of the appropriate attachment may be determined, in one embodiment, based on attachment name anchors. However, other mechanisms may also be employed. This issue is more relevant where a message has multiple attachments. Thus, if the message has a single attachment, the keywords that remain in a relevant sentence $s_i$ may be added to keywords $K_{EA}$ for that single attachment. Otherwise, if $s_i$ includes tokens from the name of an attachment $A_j$ being within the set A, then the keywords identified at block 508 are added as tags/keywords to the attachment $A_j$ alone. These keywords identified from $s_i$ are not added to the set $K_{EA}$ which contains keywords common to all attachments to the message.

Continuing next to block 512, in one embodiment a user (recipient or sender of the message being evaluated) may be provided with a user interface that enables the user to select various keywords that have been identified, and remove them from the list. Since keywords are generated automatically, it may be possible that they include information that may be considered as private, offensive, or the like, to the user and/or others. When tagged or otherwise associated with the attachment, in one embodiment, the keywords may become part of the meta-data of the attachment. Therefore, due to this concern, uses may be provided, in one embodiment, with an opportunity to expunge selected words from the keyword list. However, in another embodiment, such removal may be performed automatically. Thus, for example, an online machine learning framework may be employed where as the user accepts or rejects each keyword that is provided in a display to the user, such feedback may be employed to learn over time to predict which keywords the user is most likely to accept and/or delete. In this manner selected keywords may be privatized.

Flowing next to block 514, various mechanisms may then take advantage of the keywords associated with an attachment to perform such activities as indexing, searching, sorting, or the like. Such activities may be performed using any of a variety of tools, including for example, various file management tools, or the like.

Processing then flows to decision block 516 to determine whether to continue managing attachments. If so, processing loops hack block 502; otherwise, processing may return to a calling process to perform other actions.

Figure 6:
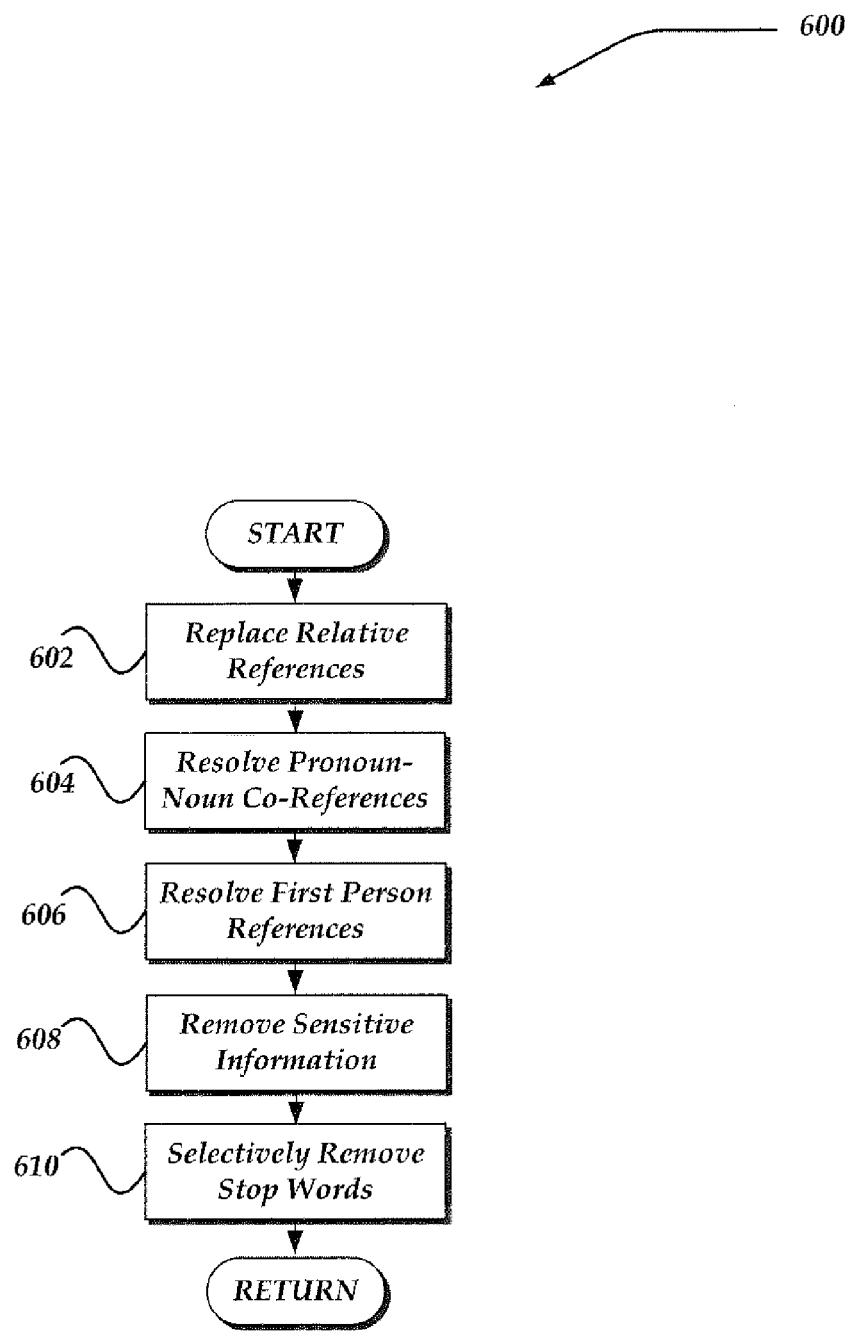
FIG. 6 illustrates a logical flow diagram generally showing one embodiment of an overview process for selecting keywords from the relevant sentences.

FIG. 6 illustrates a logical flow diagram generally showing one embodiment of an overview process for selecting keywords from the relevant sentences. Process 600 of FIG. 6 may represent one embodiment, of a process performed at block 508 of process 500. In one embodiment, process 600 addresses the second sub-problem identified above of identifying the keywords $K_{EA}$ from $\hat{S}_{EA}$ that are relevant to A. Once the set $\hat{S}_{EA}$ is identified, the keywords may be identified by applying a set of heuristics in sequence on each sentence $s_i$ with the set of sentences $\hat{S}_{EA}$.

Thus, process 600 begins, after a start block, at block 602, where relative references are replaced with the actual references. For example, relative date references, such as "tomorrow," "Monday," "next week," or the like are replaced with an actual calendar date, such as Apr. 8, 2010, or the like. In one embodiment, information in the message header regarding date may be used to convert the relative date references to actual calendar dates.

Moving next to block 604, pronouns are replaces with nouns that they refer to. In one embodiment, a BART framework may be or other POS tagger mechanism may be used to resolve pronoun-noun co-references. Flowing next to block 606, first person pronouns, such as I, mine, my, and the like, that refer to the sender are resolved to the sender's name. Similarly, second person pronouns, such as you, your, and the like, are resolved to the recipient's name. Both the sender's name and the recipient's name may be obtained from message headers. It is noted however, that the sender's name and recipient's name can change based on the conversation level as discussed above.

Moving next to block 608, various mechanisms, such as regex (regular expressions), or the like, may be employed to removed sensitive information, such as credit card numbers, social security information, and/or other objectionable words, phrases, or the like.

Continuing to block 610, stop words may be selectively removed from the remaining keywords. However, it is recognized that some words that may appear as stop words, such as "The," "who" or the like, in one context, may not be stop words in another context. For example, in the context of music, "The Who," would not include stop words. Thus, dictionary analysis, and/or other context analysis mechanisms may be used to selectively remove stop words from the set of keywords.

Process 600 then returns to a calling process to perform additional actions. For example, as noted above, process 600 may then flow from block 508 to block 510 of process 500 to enable the remaining keywords to be associated with the appropriate attachment.

It will be understood that each block of the flowchart illustration, and combinations of blocks in the flowchart illustration, can be implemented by computer program instructions. These program instructions may be provided to a processor to produce a machine, such that the instructions, which execute on the processor, create means for implementing the actions specified in the flowchart block or blocks. The computer program instructions may be executed by a processor to cause a series of operational steps to be performed by the processor to produce a computer-implemented process such that the instructions, which execute on the processor to provide steps for implementing the actions specified in the flowchart block or blocks. The computer program instructions may also cause at least some of the operational steps shown in the blocks of the flowchart to be performed in parallel. Moreover, some of the steps may also be performed across more than one processor, such as might arise in a multi-processor computer system. In addition, one or more blocks or combinations of blocks in the flowchart illustration may also be performed concurrently with other blocks or combinations of blocks, or even in a different sequence than illustrated without departing from the scope or spirit of the invention.

Accordingly, blocks of the flowchart illustration support combinations of means for performing the specified actions, combinations of steps for performing the specified actions and program instruction means for performing the specified actions. It will also be understood that each block of the flowchart illustration, and combinations of blocks in the flowchart illustration, can be implemented by special purpose hardware-based systems, which perform the specified actions or steps, or combinations of special purpose hardware and computer instructions.

Non-Limiting, Non-Exhaustive Example User Interface

Figure 7:
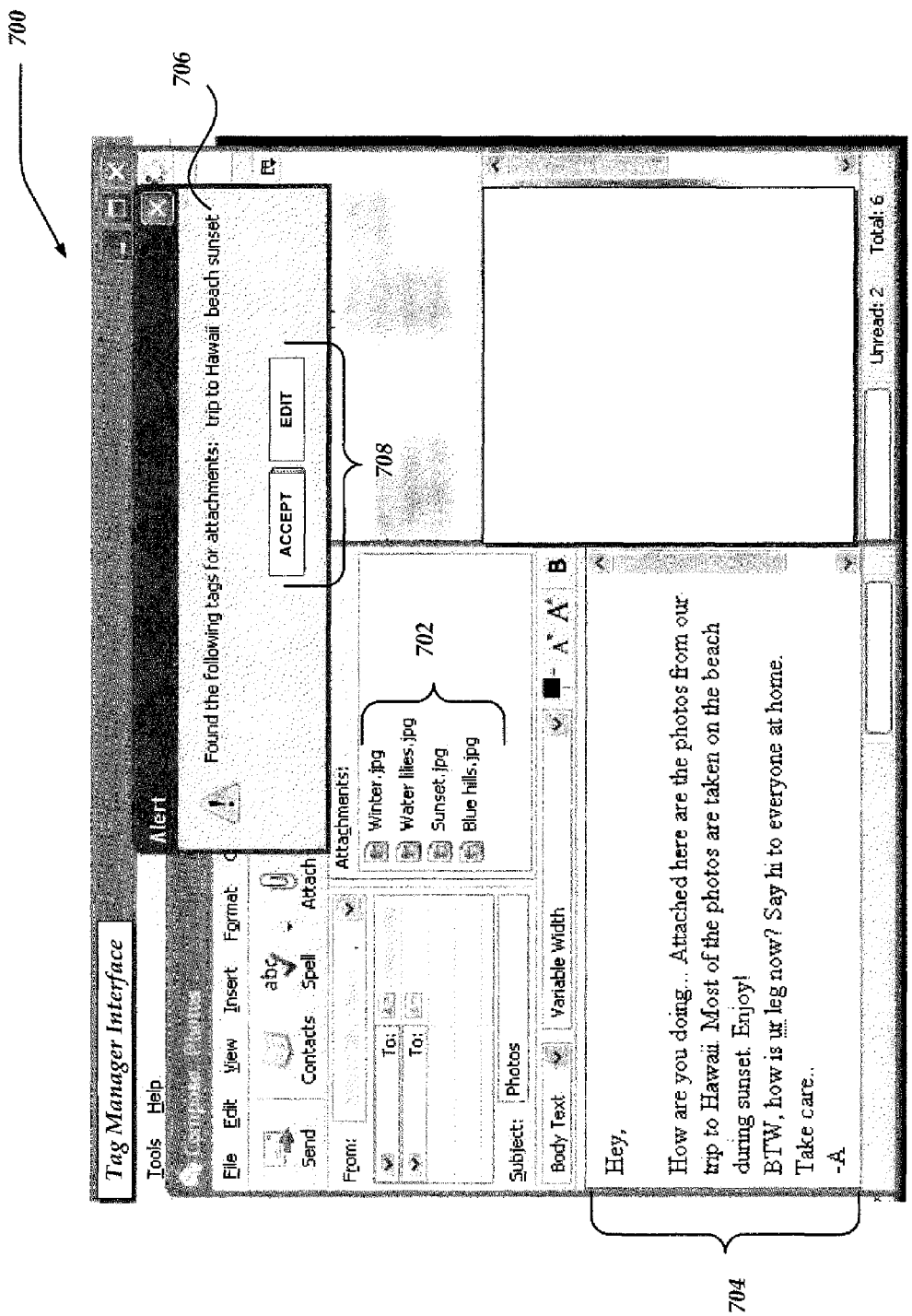
FIG. 7 illustrates a non-limiting, non-exhaustive example of a user interface useable for automatic keyword detection for attachments to a message.

FIG. 7 illustrates a non-limiting, non-exhaustive example of a graphical user interface useable for automatic keyword detection for attachments to a message. User interface 700 may include many more or less components than those shown in FIG. 7. However, the components shown are sufficient to disclose an illustrative embodiment for practicing the present invention. In one embodiment, user interface 700 may be implemented as a plug-in to a browser application, messaging application, or the like. Alternatively, user interface 700 may operate as a standalone client application, script, applet, or the like, or even an application operating on a remote network device. Because various implementations are envisaged, user interface 700 should not be construed as being limited to a particular implementation embodiment.

As shown, user interface shows attachments 702 to message 704. Also shown is one embodiment of displaying the identified keywords 706 for user review. It should be noted that other arrangements, configurations and structures may also be used to display one or more of these components of user interface 700. In any event, in one embodiment, the user may be provided with one or more selections 708 that enable the user to accept the identified keywords for subsequent association with the one or more attachments 702, or to edit the identified keywords to remove one or more keywords from the list of identified keywords 706.

In another embodiment, however, the identified keywords 706 might be displayed as multiple sub-lists, where at least one of the sub-lists identifies a subset of the identified keywords 706 that are automatically recommended to be retained, while another sub-list identified another subset of the identified keywords 706 that may be recommended for deletion. In still, another embodiment, the displayed list of identified keywords 706 might have been automatically purged of keywords determined to be sensitive, objectionable or the like, based on a mechanism such as is described above.

The above specification, examples, and data provide a complete description of the manufacture and use of the composition of the invention. Since many embodiments of the invention can be made without departing from the spirit and scope of the invention, the invention resides in the claims hereinafter appended.

What is claimed as new and desired to be protected by Letters Patent of the United States is:

1. A network device, comprising:
    a transceiver to send and receive data over a network; and
    a processor that is operative on the received data to perform actions, including:
        receiving a message having at least one attachment;
        using a machine learning model to select at least one sentence from within the message to be relevant to the at least one attachment based on a set of predefined sentence level features;
        identifying from within the relevant sentence at least one keyword determined to be further relevant to the at least one attachment; and
        associating the at least one keyword to the at least one attachment, such that the association is useable for at least one of indexing or searching of the at least one attachment.

2. The network device of claim 1, wherein the predefined sentence level features comprises at least one of an anchor feature, a noise feature, a length feature, a thread level feature, an anaphora detection feature, or a lexicon feature.

3. The network device of claim 1, wherein the at least one keyword is identified based on employing a sequence of heuristics, including:
    replacing a relative reference with an explicit reference within the relevant sentence;
    replacing a pronoun with a noun for which the pronoun refers within the relevant sentence;
    removing information determined to be sensitive or objectionable from within the relevant sentence; and
    selectively removing stop words within the relevant sentence, such that at least one resulting word is identified as the at least one keyword.

4. The network device of claim 1, wherein the message includes at least one of an email message, SMS message, MMS message, or IM message.

5. The network device of claim 1, wherein the at least one attachment includes at least one of a spreadsheet file, an image file, a video file, an audio file, or a word processing document file.

6. The network device of claim 1, wherein the predefined sentence level features include at least one of an anchor feature selected from strong phrase anchors, extension anchors, attachment name anchors, or weak phrase anchors.

7. The network device of claim 1, wherein the processor is operative to provide for display a user interface useable to enable a review or deletion of at least one keyword.

8. A system, comprising:
a network device comprising a first processor and configured to manage a messaging component for receiving and sending messages over a network; and
a tagging component residing on another network device comprising a second processor, the tagging component operative to perform actions, including:
  receiving a message having at least one attachment from the messaging component;
  using a machine learning model to select at least one sentence from within the message to be relevant to the at least one attachment based on a set of predefined sentence level features;
  identifying from within the at least one relevant sentences a set of keywords further relevant to the at least one attachment; and
  associating at least one of the keywords in the set to the at least one attachment, such that the association is useable for at least one of indexing or searching of the at least one attachment.

9. The system of claim 8, wherein the predefined sentence level features comprises at least one of an anchor feature, a noise feature, a length feature, a thread level feature, an anaphora detection feature, or a lexicon feature.

10. The system of claim 8, wherein the other network device is a client device, and the tagging component is a downloadable component onto the client device.

11. The system of claim 8, wherein the set of keywords are identified based on employing a sequence of heuristics, including:
  replacing a relative reference with an explicit reference within the at least one relevant sentence;
  replacing a pronoun with a noun for which the pronoun refers within the at least one relevant sentence;
  removing information determined to be sensitive or objectionable from within the at least one relevant sentence; and
  selectively removing stop words within the at least one relevant sentence, such that the resulting words are identified as the set of keywords.

12. The system of claim 8, wherein the tagging component is configured to employ feedback about the set of keywords and to learn over time to predict at least one other keyword that is to be retained or deleted from the set of keywords.

13. The system of claim 8, wherein the machine learning model includes a classification learning model.

14. A non-transitory computer-readable storage medium having computer-executable instructions, the computer-executable instructions when installed onto a computing device enable the computing device to perform actions, comprising:
  receiving a message having at least one attachment;
  using a machine learning model to select a set of sentences from within the message to be relevant to the at least one attachment based on a set of predefined sentence level features;
  identifying from within the set of relevant sentences a set of keywords further relevant to the at least one attachment; and
  associating at least one of the keywords in the set to the at least one attachment, such that the association is useable for at least one of indexing or searching of the at least one attachment.

15. The non-transitory computer-readable storage medium of claim 14, wherein if the message includes a plurality of attachments, then associating the at least one of the keywords in the set to less that all of the attachments in the plurality of attachments.

16. The non-transitory computer-readable storage medium of claim 14, wherein the predefined sentence level features comprise at least one of an anchor feature, a noise feature, a length feature, a thread level feature, an anaphora detection feature, or a lexicon feature.

17. The non-transitory computer-readable storage-medium of claim 14, wherein the set of keywords are identified based on employing a sequence of heuristics to modify the words with the set of relevant sentences.

18. The non-transitory computer-readable storage medium of claim 14, wherein a user interface is provided that enables removal of at least one keyword from the set of keywords.

19. The non-transitory computer-readable storage medium of claim 14, wherein the instructions further predict at least one keyword within the set of keywords that is to be removed based in part on a prior removal of at least one other keyword.

20. The non-transitory computer-readable storage medium of claim 14, wherein the computer-executable instructions are configured to be downloadable and executed from within a client device, or configured to operate within a cloud architecture.

* * * * *